US010720823B1

(12) United States Patent
Kim et al.

(10) Patent No.: US 10,720,823 B1
(45) Date of Patent: Jul. 21, 2020

(54) FERROFLUID LIQUID SPRING WITH MAGNETS BETWEEN COILS INSIDE AN ENCLOSED CHAMBER FOR VIBRATION ENERGY HARVESTING

(71) Applicant: University of Southern California, Los Angeles, CA (US)

(72) Inventors: Eun Sok Kim, Rancho Palos Verdes, CA (US); Yufeng Wang, Los Angeles, CA (US); Qian Zhang, Methuen, MA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 459 days.

(21) Appl. No.: 15/404,084

(22) Filed: Jan. 11, 2017

Related U.S. Application Data

(60) Provisional application No. 62/279,449, filed on Jan. 15, 2016.

(51) Int. Cl.
| | | |
|---|---|---|
| *H02K 33/00* | (2006.01) | |
| *H02K 15/02* | (2006.01) | |
| *H02K 35/04* | (2006.01) | |
| *H02K 35/02* | (2006.01) | |
| *H01F 41/04* | (2006.01) | |
| *H02K 35/00* | (2006.01) | |

(52) U.S. Cl.
CPC .............. *H02K 33/00* (2013.01); *H01F 41/04* (2013.01); *H02K 15/02* (2013.01); *H02K 35/00* (2013.01); *H02K 35/02* (2013.01); *H02K 35/04* (2013.01)

(58) Field of Classification Search
CPC ........ H02K 33/00; H02K 35/02; H02K 35/00; H02K 35/04; H02K 3/26; H02K 15/02; H01F 41/04
USPC ............ 310/12.01–12.33, 28, 14, 15, 16, 25
See application file for complete search history.

(56) References Cited

U.S. PATENT DOCUMENTS

| | | | | |
|---|---|---|---|---|
| 4,630,943 A * | 12/1986 | Stahl | ................... | F16C 33/1035 277/410 |
| 5,110,141 A * | 5/1992 | Dayan | .................... | F16C 35/10 277/410 |
| 5,956,204 A * | 9/1999 | Dunfield | ................. | F16C 17/24 184/6.25 |
| 6,163,091 A * | 12/2000 | Wasson | .................. | H02K 41/03 310/12.19 |
| 6,686,824 B1 * | 2/2004 | Yamamoto | .......... | H01F 17/0006 29/601 |
| 6,717,308 B2 * | 4/2004 | Chen | ..................... | F16C 33/107 310/67 R |
| 6,809,427 B2 * | 10/2004 | Cheung | .................. | H02K 35/02 290/1 R |

(Continued)

*Primary Examiner* — Maged M Almawri
(74) *Attorney, Agent, or Firm* — Snell & Wilmer LLP

(57) ABSTRACT

A vibration energy harvester includes a proof mass that is a magnetic array or a coil array. The magnetic array has multiple magnets. The coil array has one or more coils. The vibration energy harvester includes an enclosed chamber. The enclosed chamber has the other of the coil array or the magnetic array that is not the proof mass. The one or more copper coils and the multiple magnets are configured to generate the electrical energy from a relative movement between the one or more copper coils and the multiple magnets. The vibration energy harvester includes a liquid suspension that suspends the proof mass within the enclosed chamber.

13 Claims, 9 Drawing Sheets

(56) References Cited

U.S. PATENT DOCUMENTS

| | | | | |
|---|---|---|---|---|
| 6,812,598 | B2 * | 11/2004 | Cheung | H02K 35/02 290/1 R |
| 6,861,772 | B2 * | 3/2005 | Cheung | H02K 35/02 290/1 R |
| 8,193,781 | B2 * | 6/2012 | Lin | H02K 3/26 322/3 |
| 8,552,607 | B2 * | 10/2013 | Chan | H02K 7/088 310/90 |
| 8,861,776 | B2 * | 10/2014 | Lastrucci | H04R 11/02 310/12.01 |
| 9,041,230 | B2 * | 5/2015 | Arnold | H02K 35/04 290/1 R |
| 9,130,445 | B1 * | 9/2015 | Katz | H04R 9/025 |
| 9,231,461 | B2 * | 1/2016 | Kim | H02K 35/00 |
| 9,576,713 | B2 * | 2/2017 | Goodman | H01F 7/1638 |
| 9,692,287 | B2 * | 6/2017 | Yamamoto | H02K 35/02 |
| 9,850,733 | B2 * | 12/2017 | Fripp | E21B 33/10 |
| 9,942,663 | B1 * | 4/2018 | Salvatti | H04R 9/025 |
| 2003/0062660 | A1 * | 4/2003 | Beard | B22F 7/06 264/645 |
| 2004/0251750 | A1 * | 12/2004 | Cheung | H02K 35/02 310/23 |
| 2005/0151375 | A1 * | 7/2005 | Cheung | B60C 23/041 290/1 R |
| 2005/0247357 | A1 * | 11/2005 | Welle | B01L 3/502738 137/828 |
| 2007/0052302 | A1 * | 3/2007 | Cheung | B82Y 25/00 310/12.12 |
| 2011/0057629 | A1 * | 3/2011 | Lin | H02K 3/26 322/3 |
| 2011/0140458 | A1 * | 6/2011 | Arnold | H02K 35/04 290/1 R |
| 2011/0140577 | A1 * | 6/2011 | Galchev | H01L 41/12 310/339 |
| 2011/0169347 | A1 * | 7/2011 | Miyamoto | B06B 1/045 310/12.21 |
| 2012/0086213 | A1 * | 4/2012 | Chan | F16C 32/0406 290/55 |
| 2012/0211990 | A1 * | 8/2012 | Davey | F03B 13/264 290/54 |
| 2013/0010999 | A1 * | 1/2013 | Lastrucci | H02K 33/16 381/400 |
| 2015/0302987 | A1 * | 10/2015 | Sano | H01F 41/041 29/602.1 |
| 2017/0084376 | A1 * | 3/2017 | Kubota | H01F 17/00 |
| 2018/0266849 | A1 * | 9/2018 | Chen | G01D 5/145 |
| 2018/0358878 | A1 * | 12/2018 | Liu | H02K 33/00 |

* cited by examiner

FERROFLUID LIQUID SPRING WITH MAGNETS BETWEEN COILS INSIDE AN ENCLOSED CHAMBER FOR VIBRATION ENERGY HARVESTING

CROSS-REFERENCE TO RELATED APPLICATIONS

This application claims priority to and the benefit of U.S. Provisional Application 62/279,449, titled "FERROFLUID LIQUID SPRING FOR VIBRATION ENERGY HARVESTING," filed on Jan. 15, 2016, and the entirety of which is hereby incorporated by reference herein.

STATEMENT REGARDING GOVERNMENT RIGHTS

This invention was made with Government support under Grant No. N66001-13-1-4055 awarded by the Defense Advanced Research Projects Agency (DARPA) and under Grant No. ECCS-1308041 awarded by the National Science Foundation (NSF). The Government has certain rights in this invention.

BACKGROUND

1. Field

This specification relates to a system for converting vibration energy to electrical energy and a method for fabricating the vibration energy harvester.

2. Description of the Related Art

Vibrations are found in many places and objects, such as building walls, bridges, automobiles, airplanes, a human body, etc. These ubiquitous vibration sources provide significant amount of renewable energy that can be harvested and used to power electronic devices including sensors, actuators, and/or wireless transceivers. Vibration energy harvesters are typically built on resonant structures with a rigid suspension, such as a membrane, a cantilever or a spring. Moreover, the fabrication process of the vibration energy harvesters are difficult, especially if the fabrication process requires a low resonant frequency. A rigid suspension is prone to breakage or failure due to strong vibrations or continual usage. Accordingly, there is a need for a more durable suspension structure with a low resonant frequency.

SUMMARY

In general one aspect of the subject matter described in this specification is embodied in a vibration energy harvester. A vibration energy harvester includes a proof mass that is a magnetic array or a coil array. The magnetic array has multiple magnets. The coil array has one or more coils. The vibration energy harvester includes an enclosed chamber. The enclosed chamber has the other of the coil array or the magnetic array that is not the proof mass. The one or more copper coils and the multiple magnets are configured to generate the electrical energy from a relative movement between the one or more copper coils and the multiple magnets. The vibration energy harvester includes a liquid suspension that suspends the proof mass within the enclosed chamber.

These and other embodiments may include one or more of the following features. The enclosed chamber may be formed by bonding micromachined silicon with the one or more copper coils and a laser-machined acrylic frame. The multiple magnets may include 2-10 Neodymium (NdFeB) magnets with alternating north and south poles. The one or more coils may be shaped in a rectangular shape. The liquid suspension may be a ferrofluid liquid suspension that becomes magnetized in the presence of a magnetic field and is attracted by a magnet. The ferrofluid liquid suspension may be configured to reduce a resonant frequency of the vibration energy harvester to 1-500 Hz.

The ferrofluid liquid suspension suspends the magnetic array in the middle of the chamber, as the attractive forces of the ferrofluid liquid suspension counteracts each other when there is no applied acceleration. Consequently, the center of a respective copper coil of the one or more copper coils may be aligned with a boundary between two magnets of the multiple magnets.

The magnetic array may be displaced from the middle of the chamber. A portion of the ferrofluid that has no symmetric counterpart may attract the magnetic array toward the middle of the chamber. The amount of displacement between the displaced magnet array from the middle of the chamber may be proportional to a force applied by the portion of the ferrofluid liquid suspension that has no symmetric counterpart to pull the displaced magnetic array back into the middle of the chamber.

In another aspect, the subject matter is embodied in a vibration energy harvester. The vibration energy harvester includes a magnetic array that may have a first magnet and a second magnet. The vibration energy harvester may include a copper coil. The copper coil may be aligned with a boundary between the first magnet and the second magnet. The copper coil and the magnet may be configured to generate electrical energy from a relative movement between the copper coil and the magnetic array. The vibration energy harvester may include a ferrofluid liquid suspension within the enclosed chamber that suspends the magnetic array. The ferrofluid liquid suspension may suspend the magnetic array in the middle of the enclosed chamber.

In another aspect, the subject matter is embodied in a method for fabricating the vibration energy harvester. The method may include forming a coil plate having a silicon substrate layer, one or more connection electrodes, a thin film of silicon nitride and two or more coils. Forming the coil plate may include etching a portion of the silicon substrate layer to form the thin film of silicon nitride and one or more trenches and forming the one or more connection electrodes using one or more metal portions that are positioned between the two or more coils to be deposited. Forming the coil plate may include evaporating or sputtering the one or more metal portions, and electroplating a metal to form the two or more coils of a coil plate. The method may include assembling multiple magnets in a laser-cut acrylic chamber. The method may include bonding the laser-cut acrylic chamber with the coil plate so that the multiple magnets are positioned within the one or more trenches. The method may include filling the acrylic chamber with ferrofluid through an inlet hole. The method may include removing gases or air cavities entrapped in the ferrofluid through one or multiple steps of subjecting the ferrofluid-containing chamber in a vacuum system. The method may include closing the inlet hole through conformal deposition of a polymeric material such as Parylene, acrylic, silicone, urethane, etc.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention.

DETAILED DESCRIPTION

Disclosed herein are systems for a vibration energy harvester that converts kinetic energy into electrical energy and methods for fabricating the vibration energy harvester. Particular embodiments of the subject matter described in this specification may be implemented to realize one or more of the following advantages. A vibration energy harvester having a liquid suspension, as a spring, is able to convert kinetic energy, such as vibration energy, into electrical energy.

Typically, a vibration energy harvester has a resonant structure with a solid or rigid suspension. A rigid suspension results in a higher resonant frequency which results in the difficulty of capturing vibrations having a lower resonant frequency. Most vibrations occur at the lower resonant frequency, e.g., between 0 and 99 Hz. Thus, the size or volume of the resonant structure with the rigid suspension is increased to reduce the resonant frequency of the resonant structure to capture the vibrations at the lower resonant frequency. Thus, a resonant structure with a rigid suspension has difficulty in capturing vibrations at the lower resonant frequency.

A resonant structure with a liquid suspension, however, has a lower resonant frequency, and so, the size or the volume of the resonant structure with the liquid suspension may remain the same or may be reduced to capture the vibrations that occur at the lower resonant frequency. Thus, the resonant structure with the liquid suspension may be incorporated into smaller devices, such as smart watches or other wearable devices, and more efficiently capture and convert the vibration energy into electrical energy. Additionally, since the resonant structure with the liquid suspension resonates at the lower resonant frequency and matches the vibrations at the lower resonant frequency, the vibration energy harvester more efficiently captures and converts the kinetic energy of the vibrations into electrical energy.

Other benefits and advantages include the liquid suspension acting as a lubricant between the chamber and the proof mass which reduces the amount of friction and/or heat generated as a result of the movement or displacement of the proof mass. Additionally, a vibration energy harvester that has a resonant structure with a liquid suspension is more durable than one with a rigid solid suspension due to the molecular composition of a liquid in comparison to a solid. The increased durability and reduced friction decreases the amount of wear and aging to the vibration energy harvester.

Figure 1A:
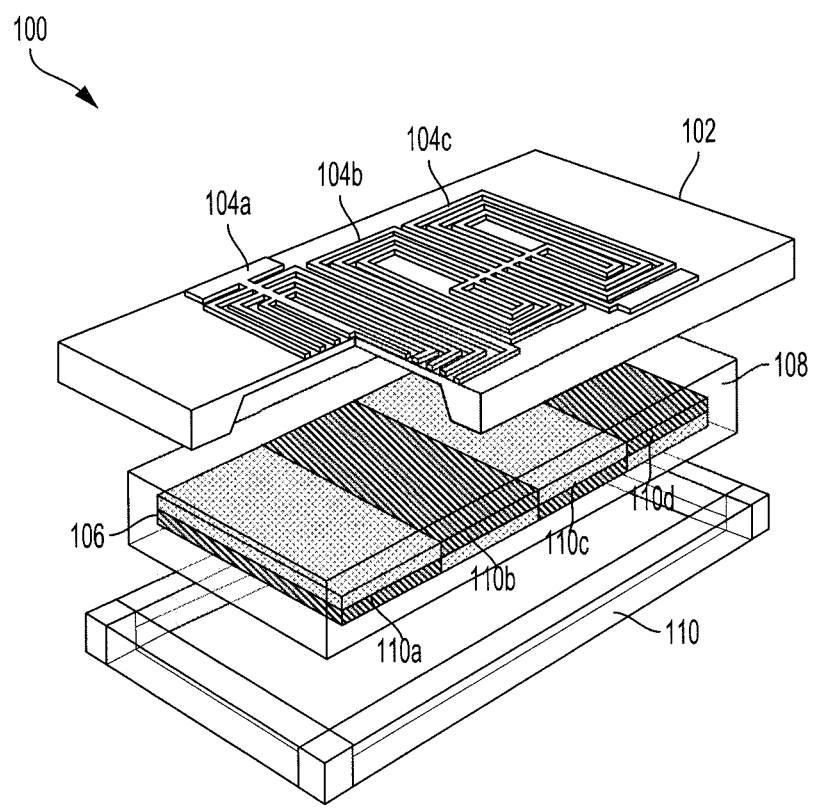
FIGS. 1A-1B illustrate exploded views of an example vibration energy harvester according to an aspect of the invention.
Figure 1B:
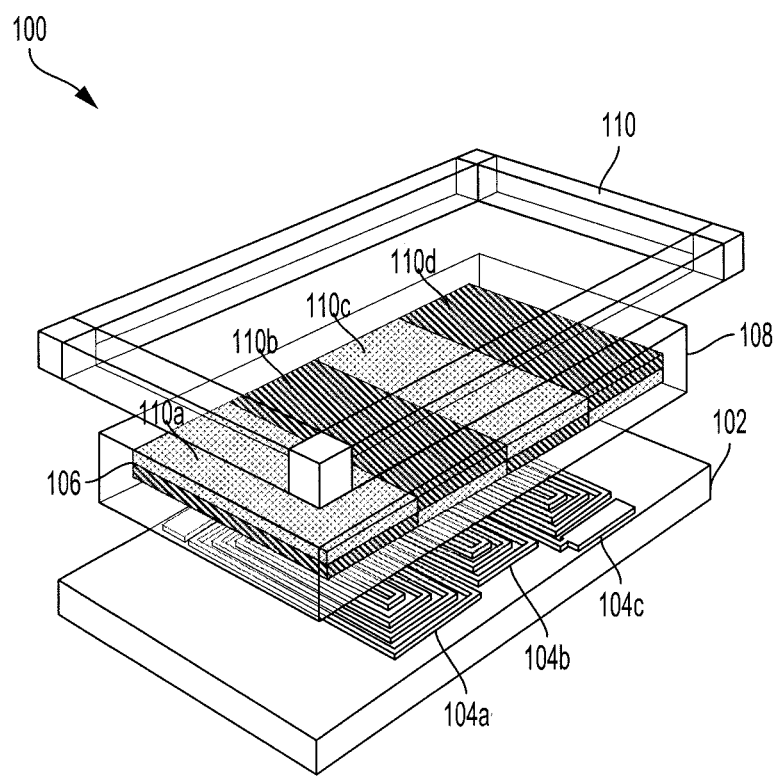

FIGS. 1A and 1B are exploded views of a vibration energy harvester 100 that converts kinetic energy, such as vibration energy, into electrical energy. The vibration energy harvester 100 has a resonant structure that includes a liquid suspension 108, a frame 110, a proof mass, such as a magnetic array 106 or a coil array, and a plate, such as a coil plate 102 or a plate with magnets. The proof mass may be the magnetic array 106 or the coil array. If the magnetic array 106 is the proof mass, the one or more coils 104a-c are mounted on the plate to form the coil plate 102. If the coil array is the proof mass, the one or more magnets of the magnetic array 106 are mounted on the plate. The coil plate 102 may have multiple layers. Thus, the magnets or the coils may be the proof mass so long as the other is mounted on the plate.

The liquid suspension 108 is formed in an enclosed chamber made by bonding the plate with a frame 110. The plate, such as the coil plate 102, may be a micromachined silicon with one or more electroplated copper coils 104a-c, and the frame 110 may be a laser-machined acrylic frame. The position of the plate and/or the shape of the one or more coils 104a-c impacts the generation of the electromotive force by the vibration energy harvester 100. The plate may be positioned either above or below the proof mass.

The position of the plate impacts the generation of the electromotive force because a gravitational force acts downward on the proof mass that is suspended within the chamber by the liquid suspension 108. FIG. 1A is an exploded view of the vibration energy harvester 100 having the coil plate 102 positioned above the magnetic array 106. FIG. 1B is an exploded view of the vibration energy harvester 100 having the coil plate 102 positioned below the magnetic array 106.

The downward gravitational force increases the distance between the plate and the proof mass when the plate is located above the proof mass and decreases the distance between the plate and the proof mass when the plate is located below the proof mass. When the plate is below the proof mass and the downward gravitational force reduces the distance between the plate and the proof mass, the vibration energy harvester 100 more efficiently converts kinetic energy into electrical energy. An increase in the distance between the plate and the proof mass, when the plate is above the proof mass, decreases the conversion efficiency of the vibration energy harvester 100.

The electromotive force between the plate and the proof mass is also based on the number of coil turns in each of the one or more coils and the shape of the one or more coils 104a-c. More coil turns result in a larger electromotive force produced from the relative movement between the one or more coils 104a-c and the magnetic array 106. The one or more coils 104a-c may be shaped as a square coil, a rectangular coil, a circular coil or any other shape.

Figures 2A, 2B:
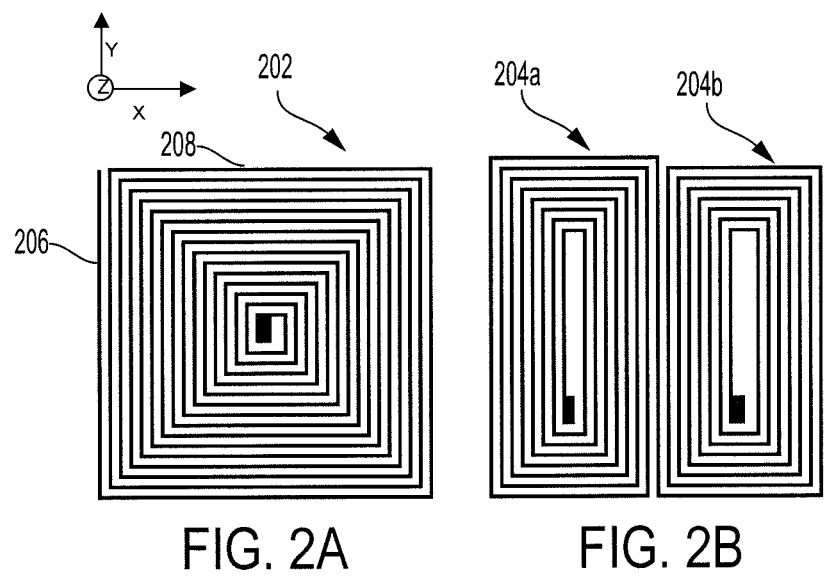
FIG. 2A illustrates a square shaped coil according to an aspect of the invention.
FIG. 2B illustrates two rectangular shaped coils according to an aspect of the invention.

FIGS. 2A and 2B show a square coil 202 and two rectangular coils 204a-b, respectively. When the polarization is along the Z axis and the vibration or displacement is along the X axis, the electromotive force depends on the Z component of the magnetic flux density. Therefore, only wires 206 along the Y axis cut the magnetic field line and contribute to the electromotive force while the wires 208 along the X axis only add resistance that needs to be minimized. Since the two rectangular coils 204a-b occupy the same area as the square coil 202, as long as the coils have the same wire width and spacing, a larger percentage, i.e., 67% of the wires in the rectangular coil contribute to the electromotive force while only half (50%) of the wires in the square coil contribute to the electromotive force.

The magnetic array 106 may be formed by multiple magnets 110a-d, e.g., 2-10 Neodymium (NdFeB) magnets. The multiple magnets 110a-d may be arranged with alternating north and south poles to provide a larger magnetic field gradient. The relative movement between the one or more coils 104a-c and the magnetic array 106 due to an applied acceleration produces the electromotive force. The liquid suspension 108 aligns the center of each of the one or more coils 104a-c with the boundary between two magnets of the magnetic array 106 where the magnetic flux gradient peaks to maximize the electromotive force. For example, the first coil 104a may be centered at the boundary of the first magnet 110a and the second magnet 110b.

The liquid suspension 108 may be water or other liquid, such as a ferrofluid. The liquid suspension 108 surrounds and encloses the proof mass within the enclosed chamber. A ferrofluid is a liquid that has magnetic nanoparticles and becomes strongly magnetized in the presence of a magnetic field, and is attracted by a magnet. The ferrofluid liquid suspension works as a mechanical spring. The attractive forces of the ferrofluid liquid suspension that surrounds the proof mass counteract each other when the proof mass is in the center of the enclosed chamber, i.e., in a balanced position, when there is no applied acceleration. When the proof mass is displaced, the part of the ferrofluid suspension which has no symmetric counterpart draws or pulls the proof mass in the opposite direction. A non-ferrofluid liquid suspension, however, does not self-align the proof mass in the center of the enclosed chamber.

Figure 3A:
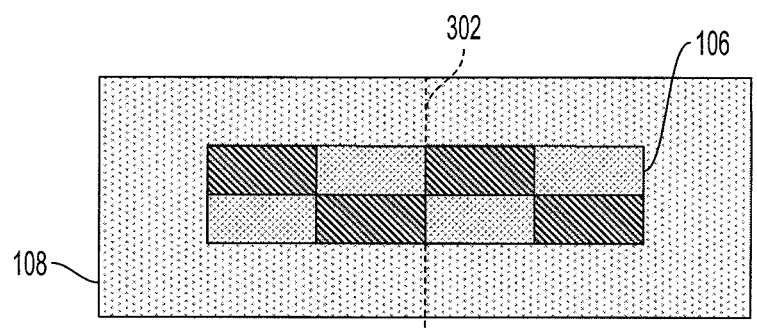
FIGS. 3A-3B illustrate the self-alignment of the magnetic array within the ferrofluid liquid suspension according to an aspect of the invention.
Figure 3B:
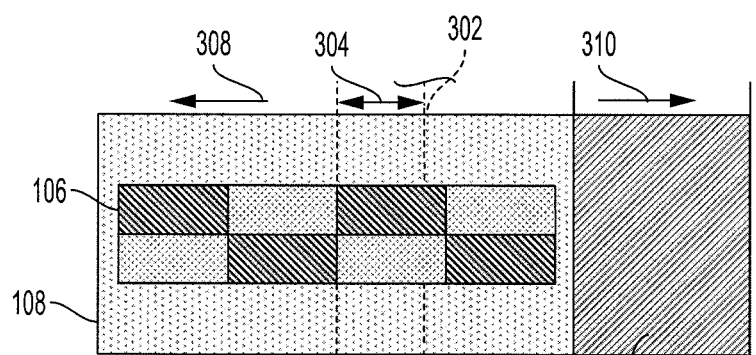

FIGS. 3A-3B illustrate the self-alignment of the magnetic array 106 within a liquid suspension 108 that is a ferrofluid liquid suspension. When an acceleration, e.g., due to vibration, is applied in the direction 308 and displaces the magnetic array 106 a distance 304, a portion 306 of the ferrofluid liquid suspension applies a restoring force in the direction 310 along the x-axis to the magnetic array 106 to pull the magnetic array 106 back into the balanced position 302. The larger the acceleration that is applied in the direction 308, the larger the displacement of the magnetic array 106 from the balanced position 302. The restoring force or force to pull back the magnetic array 106 is proportional and/or directly correlated to the deviated distance 304 from the balanced position 302. Moreover, the restoring force is further based on the ferrofluid's nanoparticle density and dimensions of the chamber, i.e., the height and the width of the chamber. When no acceleration is applied, the ferrofluid liquid suspension automatically keeps the magnetic array 106 situated in the middle of the chamber in the balanced position 302 and aligned with the one or more coils 104a-c.

The magnetic array 106 is aligned with the one or more coils 104a-c when the center of each coil of the one or more coils 104a-c is aligned with a boundary between two magnets 110a-d. For example, if there are four adjacent magnets 110a-d and three coils 104a-c where the center of a first coil 104a is aligned with the boundary of the first magnet 110a and a second magnet 110b that is adjacent to the first magnet 110a, the second coil 104b is aligned with the boundary of the second magnet 110b and a third magnet 110c that is adjacent to the second magnet 110b, and the third coil 104c is aligned with the boundary of the third magnet 110c and a fourth magnet 110d that is adjacent to the third magnet 110c.

The equivalent spring constant of the ferrofluid liquid suspension is proportional to the particle density of the ferrofluid and the dimensions of the chamber. That is, the restoring force needed to extend or compress the ferrofluid liquid suspension to displace the proof mass depends on the viscosity of the ferrofluid. Thus, the viscosity of the liquid suspension is directly proportional to the equivalent spring constant which is directly correlated with the resonant frequency so a less condensed or viscous liquid has a lower spring constant and a lower resonant frequency than a highly viscous liquid. The magnetic properties of the magnetic nanoparticles in the ferrofluid also effect the spring constant and the resonant frequency. The strength of the magnetic field generated by the magnetic nanoparticles also directly correlates with the spring constant and corresponding frequency. That is, a stronger magnetic field has a greater spring constant and corresponding resonant frequency, and a weaker magnetic field has a smaller spring constant and corresponding resonant frequency. By having a lower resonant frequency, the resonant structure is able to more efficiently capture and convert vibrations that are at a lower resonant frequency to electrical energy.

The vibration energy harvester 100 may be tuned to more efficiently capture and convert vibration energy into electrical energy by altering and/or adjusting the dimensions, parameters and/or configurations of the resonant structure including shape, position and/or size of the coils, the number and magnetic characteristics of the magnets and/or the composition of the liquid suspension, e.g., the viscosity, density and/or magnetic characteristics of the liquid suspension. The vibration energy harvester 100 in FIG. 1A has, for example, the following dimensions and parameters with the coil plate 102 located above the magnetic array 106:

TABLE 1

Dimensions and Parameters of the Vibration Energy Harvester

| | |
|---|---|
| Magnet size | 6.4 × 3.2 × 0.8 mm$^3$ |
| Surface field | 2,186 Gauss |
| Total weight | 1 g |
| Total volume | 18.4 × 11 × 1.7 mm$^3$ |
| Coil width | 100 μm |
| Coil spacing | 100 μm |
| Coil thickness | 30 μm |
| Resistance | 2.3 Ω |

Figure 4A:
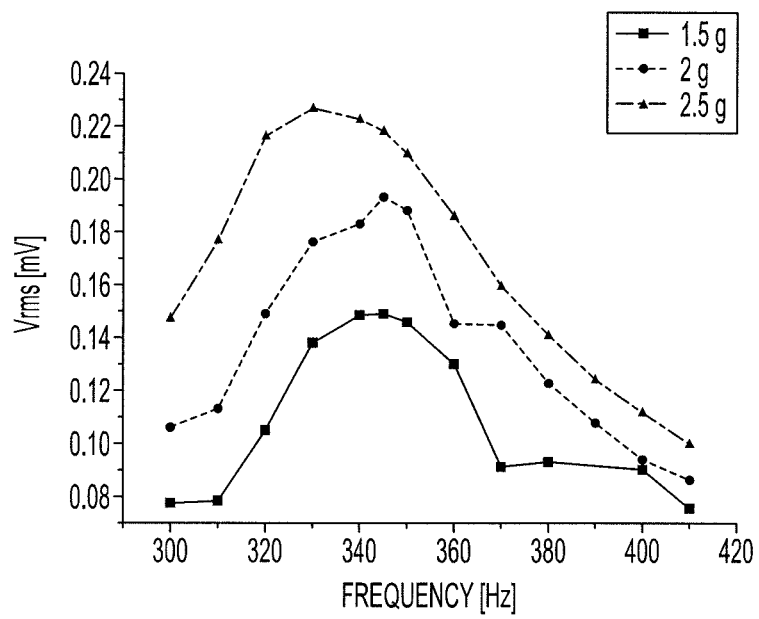
FIGS. 4A-4B illustrate graphs of the measured output voltages of the example vibration energy harvester of FIG. 1A according to an aspect of the invention.

The measured output voltages as a function of frequency under various accelerations are shown in FIG. 4A for a vibration energy harvester 100 having the dimensions and parameters of Table 1 and filled with a ferrofluid liquid suspension, such as Ferrotec APG 1123. At a fixed acceleration, the voltage depends on the vibration frequency and peaks at a resonant frequency. The measured resonant frequency is approximately 340 Hz. The resonant frequency decreases as the input acceleration increases which indicates that the ferrofluid liquid suspension becomes softer as the vibrational amplitude increases.

Figure 4B:
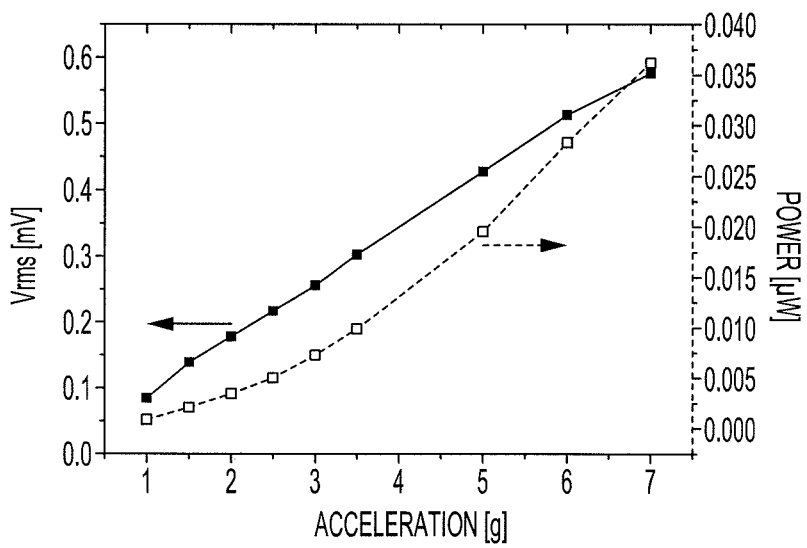

The root mean square (rms) of the output voltage and power that may be delivered to a matched load are shown in FIG. 4B. The output voltage depends linearly on the applied acceleration, and 36 nW is delivered into a load of 2.3Ω from 7 g acceleration which corresponds to 17 μm of vibrational amplitude at 320 Hz.

In another example, the vibration energy harvester 100 of FIG. 1B has the following dimensions and parameters with the coil plate 102 located below the magnetic array 106:

TABLE 2

Dimensions and Parameters of the Vibration Energy Harvester

| Magnet size | 6.4 × 3.2 × 0.8 mm$^3$ |
| Surface field | 2,186 Gauss |
| Total weight | 1 g |
| Total volume | 17 × 11 × 2.5 mm$^3$ |
| Coil width | 100 μm |
| Coil thickness | 30 μM |
| # of layers | 6 |
| Resistance | 4.5 Ω |

Figure 5A:
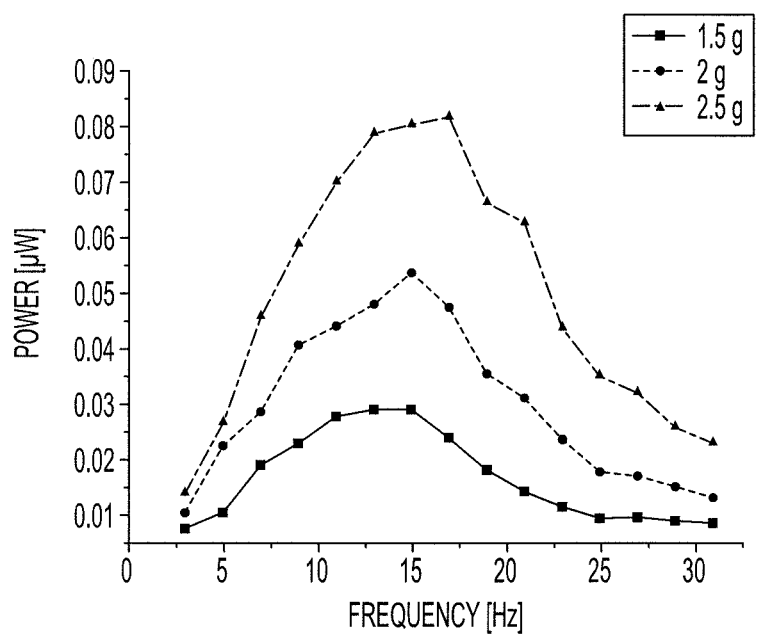
FIGS. 5A-5B illustrate graphs of the measured output voltage of the example vibration energy harvester of FIG. 1B according to an aspect of the invention.
Figure 5B:
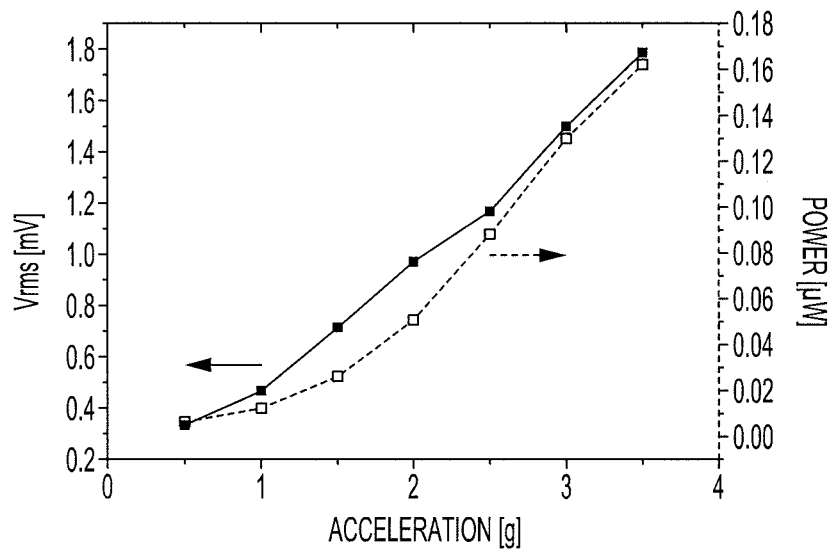

The vibration energy harvester 100 with the dimensions and parameters of Table 2 may be filled with a less dense, water-based ferrofluid, such as Ferrotec, EMG 705, to further reduce the resonant frequency. The frequency response is shown in FIG. 5A and is approximately 15 Hz. The output voltage power delivered into a matched load is shown in FIG. 5B, and 176 nW is delivered into a load of 4.5Ω from 3.5 g acceleration which corresponds to 3.9 mm of vibrational amplitude at 15 Hz. The resonant frequency has been reduced due to the adoption of a less dense ferrofluid, and the conversion efficiency has been increased through a multilayer coil plate and having the coil plate below the magnetic array which results in a gravitational force pushing the magnetic array closer to the coil plate.

Figure 6:
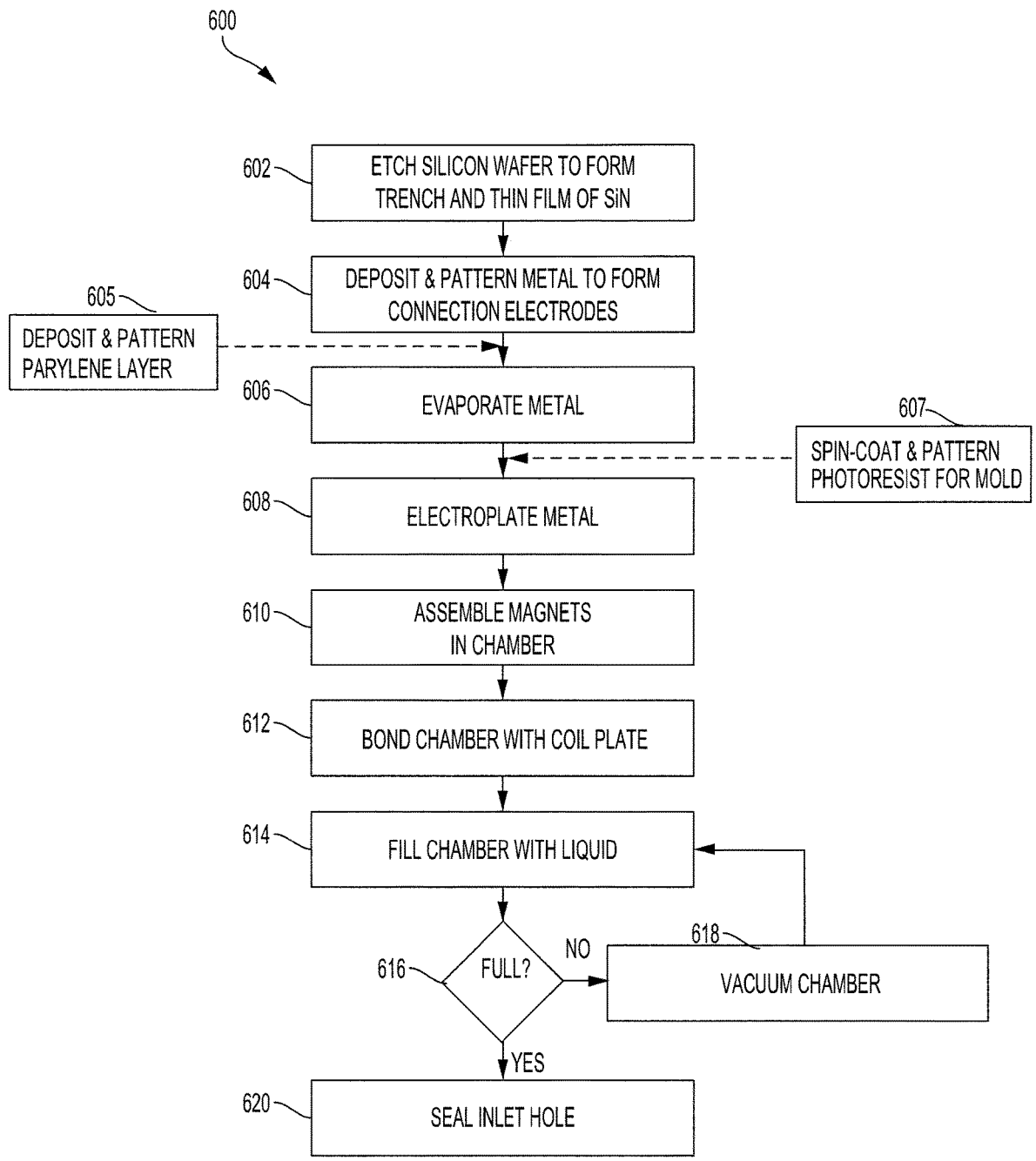
FIG. 6 illustrates a flow diagram of an example process for fabricating a vibrating energy harvester according to an aspect of the invention.

FIG. 6 is a flow diagram of an example process 600 for fabricating a vibration energy harvester. A microfabrication system may have one or more controllers or processors, appropriately programmed, to implement the process 600 to form the vibration energy harvester 100. FIGS. 7A-7F show cross-sectional views of the fabrication of the vibration energy harvester. The vibration energy harvester 100 has a coil plate 102, a magnetic array 106 and a chamber 714.

Figure 7A:
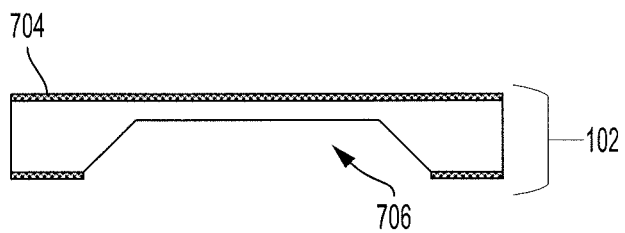
FIGS. 7A-7F illustrate cross-sectional views of an example vibration energy harvester formed by the process of FIG. 6 according to an aspect of the invention.

The coil plate 102 includes a silicon substrate layer 702 having at trench 706, one or more connection electrodes and at least one coil. The microfabrication system etches a portion of the silicon substrate layer (or silicon wafer) 702 to form a thin film of silicon nitride (SiN) (or SiN microdiaphragms) 704 through low pressure chemical vapor deposition (LPCVD) and one or more trenches 706 (602). FIG. 7A shows a cross-sectional view of the vibration energy harvester being formed after the silicon wafer or substrate layer is etched. The microfabrication system may use potassium hydroxide (KOH) to etch the silicon substrate layer 704. The trench 706 may be 200 μm deep.

Figure 7B:
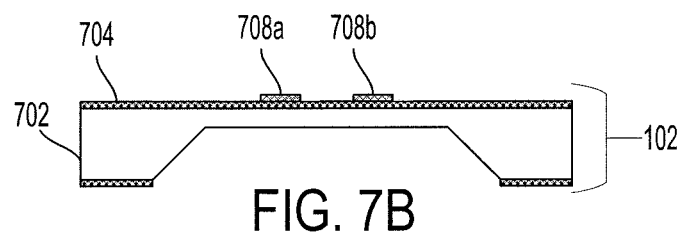

The microfabrication system forms the one or more connection electrodes (604). The microfabrication system deposits and/or patterns a first set of one or more metal portions 708a-b to form the one or more connection electrodes. FIG. 7B shows a cross-sectional view of the vibration energy harvester being formed after the one or more metal portions are deposited on the thin film of SiN to form the one or more connection electrodes. The one or more metal portions 708a-b are positioned in between the coils that are to be deposited, and may be formed from titanium (Ti) or copper (Cu).

Figure 7C:
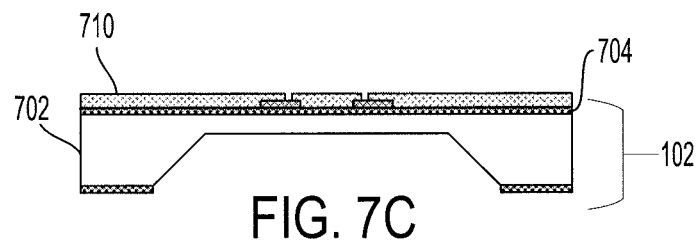

The microfabrication system may deposit and pattern a parylene isolation layer 710 (605). FIG. 7C shows a cross-sectional view of the vibration energy harvester being formed after the parylene isolation layer 710 is deposited. The parylene isolation layer 710 may have a thickness of 1 μm, and provide for electrical insulation. The parylene isolation layer 710 may be deposited on top of the thin-film of SiN, the silicon substrate layer 702 and the first set of the one or more metal portions 708a-b. The microfabrication system may pattern the parylene isolation layer 710 so that there are one or more gaps that allow the first set of the one or more metal portions 708a-b to be accessible to allow for an electrical connection with a second set of one or more metal portions 712a-d.

The microfabrication system may perform evaporation deposition to deposit and pattern the second set of one or more metal portions 712a-d on top of the parylene isolation layer 710 (606). The one or more metal portions 712a-d may be formed from Ti or Cu. The one or more metal portions 712a-d may be deposited as a seed layer.

Figure 7D:
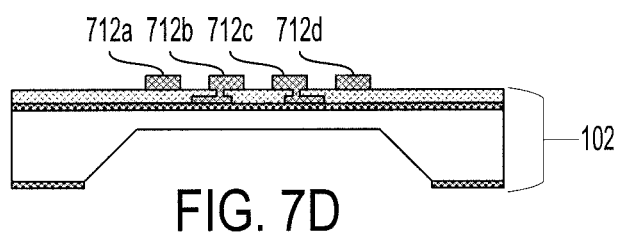

After evaporation deposition of the second set of the one or more metal portions 712a-d, the microfabrication system may spin-coat and pattern a photoresist for a mold for the coils (607). The photoresist may have a thickness of approximately 30 μm. The microfabrication system electroplates a metal, such as Cu, to form one or more coils of the coil plate using the mold (608). FIG. 7D shows the vibration energy harvester being formed after evaporation and electroplating of the second set of the one or more metal portions 712a-d. The Cu metal may have a thickness of approximately 30 μm. After electroplating, the seed layer and the photoresist may be removed (609) forming the coil plate 701.

Figure 7E:
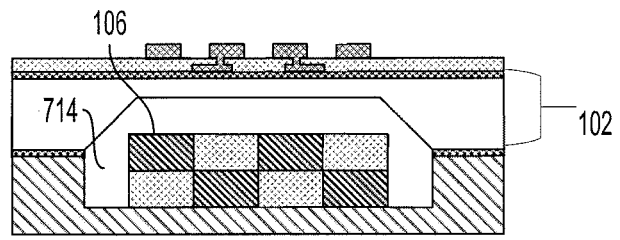

The microfabrication system may assemble one or more magnets 716 to form a magnetic array 106 within a recessed region of a laser-cut acrylic plate or chamber 714 (610). FIG. 7E shows a cross-sectional view of the vibration energy harvester being formed after assembly of the one or more magnets 716. The one or more magnets may be arranged with alternating north and south poles and may be NdFeB magnets. After the one or more magnets 716 are assembled, the microfabrication system may bond the chamber 714 with the coil plate 102 formed from the silicon substrate layer 702 that has the one or more trenches 706 (612).

Figure 7F:
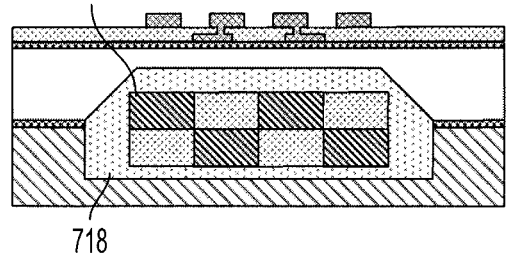
Figures 8A, 8B, 8C:
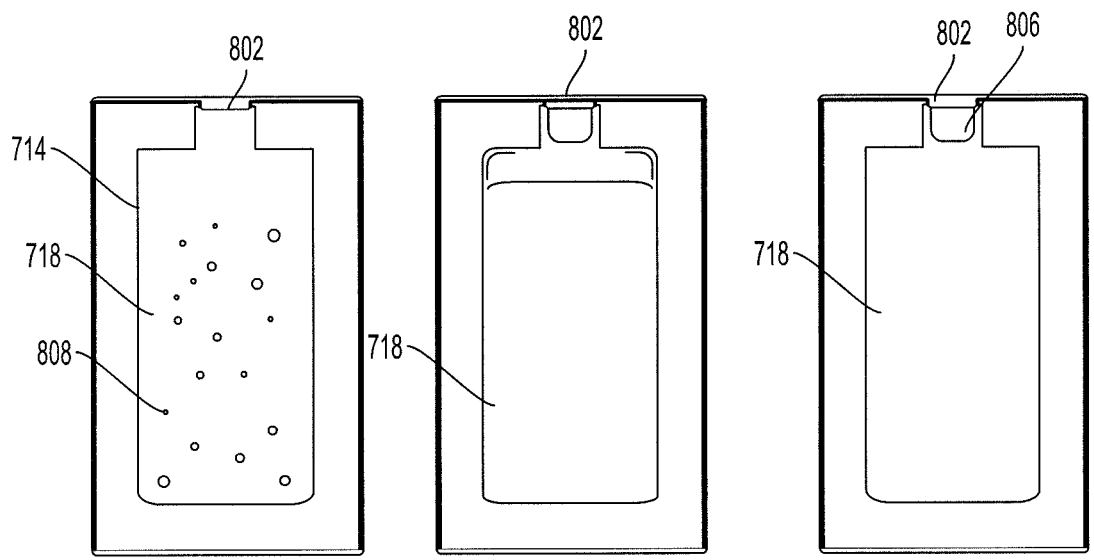
FIG. 8A illustrates an interior view of a chamber of the vibration energy harvester showing a liquid suspension within the chamber according to an aspect of the invention.
FIG. 8B illustrates an interior view of a chamber of the vibration energy harvester showing a partially filled chamber according to an aspect of the invention.
FIG. 8C illustrates an interior view of the chamber of the vibration energy harvester after being filled, vacuumed and refilled according to an aspect of the invention.

The microfabrication system fills the chamber 714 that contains the magnetic array 106 with a liquid, e.g., a ferrofluid, to suspend the magnetic array 106 within the chamber 714 (614). The chamber 714 is filled with the liquid suspension 718 through an inlet hole 802 in the chamber 714. FIG. 7F shows a cross-sectional view of the vibration energy harvester being formed after the chamber 714 is filled with the liquid suspension 718. FIG. 8A shows a chamber 714 filled with the liquid suspension 718.

The microfabrication system determines whether the chamber 714 is fully filled or if there is air, bubbles or other gas within the chamber 714 (616). If the chamber 714 is not fully filled, the microfabrication system vacuums the chamber 714 to remove any gaseous bubbles or air and then refills the chamber 714 with the liquid suspension 718 (618). FIG. 8B shows the chamber 714 with a vacant portion 806 after a portion of the air or bubbles 808 has been vacuumed or removed.

The microfabrication system continues to refill and vacuum the chamber 714 with the liquid until the chamber is fully filled. A chamber 714 is fully filled when there is no air or gas remaining within the chamber 714. FIG. 8C shows the chamber 714 after several cycles of filling the chamber 714 with liquid suspension and then vacuuming the air or bubbles 808 resulting in a smaller vacant portion 806.

The microfabrication system seals the inlet hole 802 when the chamber 714 is fully filled (620). The microfabrication system seals the inlet hole 802 with a parylene layer to contain the liquid suspension 718 inside the chamber 714. The parylene layer is coated over the chamber 714 at room temperature to seal the inlet hole 802. The parylene is coated conformally over the chamber 714 and may surround the entire chamber 714.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vibration energy harvester that converts kinetic energy to electrical energy, comprising:
   a proof mass that is a magnetic array having a plurality of magnets or a coil array having one or more copper coils;
   an enclosed chamber having the other of the coil array or the magnetic array, wherein the one or more copper coils and the plurality of magnets are configured to generate the electrical energy from a relative movement between the one or more copper coils and the plurality of magnets; and
   a ferrofluid liquid suspension that completely encloses and suspends the proof mass within the enclosed chamber, wherein when the magnetic array is displaced from a middle of the enclosed chamber, a portion of the ferrofluid liquid suspension that has no symmetric counterpart attracts the magnetic array to the middle of the enclosed chamber.

2. The vibration energy harvester of claim 1, wherein the plurality of magnets includes 2-10 Neodymium (NdFeB) magnets with alternating north and south poles.

3. The vibration energy harvester of claim 1, wherein an amount of displacement between the displaced magnetic array from the middle of the enclosed chamber is proportional to a force applied by the portion of the ferrofluid liquid suspension that has no symmetric counterpart to pull the displaced magnetic array back into the middle of the enclosed chamber.

4. The vibration energy harvester of claim 1, wherein the enclosed chamber is formed by bonding micromachined silicon with the one or more copper coils and a laser-machined acrylic frame.

5. The vibration energy harvester of claim 1, wherein a center of a respective copper coil of the one or more copper coils is aligned with a boundary between two magnets of the plurality of magnets due to the liquid suspension.

6. The vibration energy harvester of claim 1, wherein the ferrofluid liquid suspension is configured to reduce a resonant frequency of the vibration energy harvester to 1-500 Hz.

7. The vibration energy harvester of claim 1, wherein the one or more copper coils are shaped in a rectangular shape.

8. The vibration energy harvester of claim 1, wherein the ferrofluid liquid suspension becomes magnetized in a presence of a magnetic field and is attracted by a magnet.

9. The vibration energy harvester of claim 8, wherein the ferrofluid liquid suspension suspends the magnetic array in a middle of the enclosed chamber so that attractive forces of the ferrofluid liquid suspension counteract each other when there is no applied acceleration.

10. A vibration energy harvester, comprising:
    a magnetic array having a first magnet and a second magnet;
    an enclosed chamber having a plurality of copper coils, the plurality of copper coils and the magnetic array configured to generate electrical energy from a movement of the magnetic array in a first direction parallel to the plurality of copper coils; and
    a ferrofluid liquid suspension within the enclosed chamber that is configured to suspend the magnetic array within the enclosed chamber, the ferrofluid liquid suspension having a portion that has no symmetric counterpart and that attracts the magnetic array laterally in a second direction that is opposite the first direction to a center of the enclosed chamber,
    wherein the ferrofluid liquid suspension is self-aligning when an acceleration is applied in the second direction and displaces the magnetic array in the first direction.

11. The vibration energy harvester of claim 10, wherein the ferrofluid liquid suspension is further configured to align a copper coil of the plurality of copper coils with a boundary between the first magnet and the second magnet.

12. The vibration energy harvester of claim 10, wherein the portion of the ferrofluid liquid suspension that has no symmetric counterpart draws or pulls the magnetic array to attract the magnetic array laterally in the second direction when an acceleration is applied in the second direction and displaces the magnetic array in the first direction.

13. The vibration energy harvester of claim 10, wherein an amount of the electrical energy that is generated is based on a velocity of a relative movement between the plurality of copper coils and the magnetic array and a magnetic flux density of the plurality of copper coils.

* * * * *